(12) United States Patent
Kean et al.

(10) Patent No.: US 7,482,908 B2
(45) Date of Patent: Jan. 27, 2009

(54) RADIO-FREQUENCY-DEVICE PERSONALIZATION

(75) Inventors: Brian Kean, Missouri Valley, IA (US); Jennifer Larsen, Omaha, NE (US); David William Cully, Omaha, NE (US); James L. Collette, Omaha, NE (US)

(73) Assignee: First Data Coporation, Greenwood Village, CO (US)

( * ) Notice: Subject to any disclaimer, the term of this patent is extended or adjusted under 35 U.S.C. 154(b) by 228 days.

(21) Appl. No.: 10/911,979

(22) Filed: Aug. 4, 2004

(65) Prior Publication Data

US 2006/0028319 A1    Feb. 9, 2006

(51) Int. Cl.
*H04Q 5/22* (2006.01)
(52) U.S. Cl. .................. 340/10.51; 340/10.1; 340/572.1
(58) Field of Classification Search .............. 340/10.51, 340/10.1, 10.6, 5.8, 5.9, 572.1, 5.54; 235/380; 700/227; 705/14
See application file for complete search history.

(56) References Cited

U.S. PATENT DOCUMENTS

| | | | | |
|---|---|---|---|---|
| 5,151,684 A | * | 9/1992 | Johnsen | 340/568.1 |
| 5,218,343 A | * | 6/1993 | Stobbe et al. | 340/573.4 |
| 5,971,587 A | * | 10/1999 | Kato et al. | 700/115 |
| 6,275,745 B1 | * | 8/2001 | Critelli et al. | 700/227 |
| 6,398,109 B1 | * | 6/2002 | Ohki | 235/384 |
| 6,557,758 B1 | * | 5/2003 | Monico | 235/380 |
| 6,876,295 B1 | * | 4/2005 | Lewis | 340/10.34 |
| 7,239,226 B2 | * | 7/2007 | Berardi et al. | 340/5.61 |
| 2005/0099292 A1 | * | 5/2005 | Sajkowsky | 340/539.13 |
| 2005/0104718 A1 | * | 5/2005 | Casto et al. | 340/10.1 |

* cited by examiner

*Primary Examiner*—Edwin C Holloway, III
(74) *Attorney, Agent, or Firm*—Townsend and Townsend and Crew LLP

(57) ABSTRACT

Radio-frequency devices that have internal radio-frequency chips are personalized. A radio-frequency device is inserted into a package. An identifier is read electromagnetically from the radio-frequency chip with a radio-frequency transceiver while the radio-frequency device is within the package. Personalization information is written electromagnetically onto the radio-frequency chip while the radio-frequency device is within the package. An association between the personalization information and the identifier is recorded on a storage device.

21 Claims, 5 Drawing Sheets

RADIO-FREQUENCY-DEVICE PERSONALIZATION

CROSS-REFERENCES TO RELATED APPLICATIONS

This application is related to copending, commonly assigned U.S. patent application Ser. No. 10/718,481, entitled "AUTOMATED PREPARATION OF RADIO-FREQUENCY DEVICES FOR DISTRIBUTION," filed Nov. 19, 2003 by Fred C. Casto et al., the entire disclosure of which is incorporated herein by reference for all purposes.

BACKGROUND OF THE INVENTION

This application relates generally to radio-frequency ("rf") devices. More specifically this application relates to personalization of rf devices.

An rf device is a device that incorporates the use of electromagnetic or electrostatic coupling in the radio-frequency portion of the electromagnetic spectrum to provide a unique identification signal. The specific portion of the spectrum that is used may depend on a particular application, varying from low-frequency rf devices that operate at about several kHz, to higher-frequency rf devices that may operate at GHz levels; the transmission range is greater with higher frequencies, although devices that operate at such frequencies tend to be more costly.

In recent years, the ability to use radio-frequency transmissions to provide a unique identification signal has been exploited to provide an alternative to other identification systems. There have increasingly been efforts to expand the use of rf more widely, integrating it into financial-transaction systems as an alternative mechanism for identifying credit or debit accounts, for example. In this way, an rf identification code may substitute for information that has more traditionally been stored on the magnetic stripe of a magnetic-stripe card. A typical rf device includes an rf transponder that responds to radio-frequency waves emitted by a transceiver. Because the transponder may be relatively small, it may conveniently be integrated into a wide variety of objects rather than being limited to a standard structure as has been the case for a magnetic-stripe card. For example, rf transponders may conveniently be included in key fobs, among a variety of other types of objects.

The magnetic-stripe information is an example of a more general class of personalization information that may be provided on the rf device on an individual-by-individual basis. In the past, techniques for packaging and sending such personalized rf devices have had the risk that an rf device personalized for one individual might incorrectly be sent to a different individual. This risk arises from the way in which the personalized devices have been packaged, and which has typically been performed in one of two ways. In some instances, the rf devices are encoded prior to distribution in a highly manual fashion. After a device is personalized by encoding the personalization information on the device, it is placed in a package, with the package subsequently being labeled for distribution. This process involves a significant manual component, and is consequently slow and costly. In addition, the risk of misdirection arises from the possibility of mislabeling a package after the device has been placed inside, a risk that is significant when the distribution implicates a large number of devices. In other instances, the attempt to encode the rf devices prior to distribution is circumvented by shifting the burden of performing the encoding at a point of distribution. For example, devices may be provided to a retail outlet for purchase by customers, with the encoding being performed only upon such purchase. This approach is generally less convenient for customers, particularly for certain types of rf devices, and may be implemented with less uniformity.

There is accordingly a need in the art for improved methods and systems of personalizing rf devices for distribution.

BRIEF SUMMARY OF THE INVENTION

Embodiments of the invention provide methods of personalizing a radio-frequency device. The radio-frequency device comprises a radio-frequency chip internal to the radio-frequency device. The radio-frequency device is inserted into a package. An identifier is read electromagnetically from the radio-frequency chip with a radio-frequency transceiver while the radio-frequency device is within the package. Personalization information is written electromagnetically onto the radio-frequency chip while the radio-frequency device is within the package. An association between the personalization information and the identifier is recorded on a storage device.

In one embodiment, the identifier comprises an alphanumeric string. In another embodiment, the personalization information identifies a financial account.

In some embodiments, the package may be labeled for delivery to a recipient prior to inserting the radio-frequency device into the package. This permits an embodiment, for instance, in which prior to writing the personalization information onto the radio-frequency chip, an optical code is read from the labeled package. The personalization information to be written onto the radio-frequency chip may then be identified from the optical code. In one embodiment, the optical code comprises a bar code.

In some instances, a quality-assurance process may be performed after writing the personalization information onto the radio-frequency chip. In such a process, the optical code is read from the labeled package. The personalization information to have been written onto the radio-frequency chip is identified from the optical code. The identifier is read electromagnetically from the radio-frequency chip while the radio-frequency device is within the package. A purported identifier is retrieved from a record of an association between the personalization information and the purported identifier. The identifier is compared with the purported identifier. In some instances, the personalization information may also be read electromagnetically from the radio-frequency chip while the radio-frequency device is within the package. In such instances, the retrieved personalization information is compared with the identified personalization information to have been written onto the radio-frequency chip.

In other embodiments, an initialization process may be used in which the radio-frequency device itself comprises an optical code. Recording the association between the personalization information and the identifier may then comprise recording an association among the personalization information, the identifier, and the optical code. The initialization process may be performed prior to inserting the radio-frequency device into the package, and includes reading the optical code from the radio-frequency device. The identifier is read electromagnetically from the radio-frequency chip, and an association between the optical code and the identifier is recorded on the storage device.

In some cases, the personalization information is encrypted prior to electromagnetically writing the personalization information onto the radio-frequency chip. In such cases, an encryption key may be written electromagnetically onto the radio-frequency chip.

These methods may be used in embodiments that personalize a plurality of radio-frequency devices by initializing, personalizing, and/or quality-assurance processes for multiple devices. The quality-assurance processes may be performed on a subset of the devices rather than on every device. Those embodiments that apply the methods to multiple radio-frequency devices thus enable automated production environments in which substantial numbers of radio-frequency devices may be personalized for distribution to recipients.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Embodiments of the invention provide for automated preparation of rf devices for distribution. Such embodiments use a process in which personalization information is encoded on an rf device after the device has been placed within a package. By a series of checks with one or more databases that include information about the rf device, the personalization information, and the package, the risk of misdirection of a personalized rf device is substantially reduced.

Figure 1:
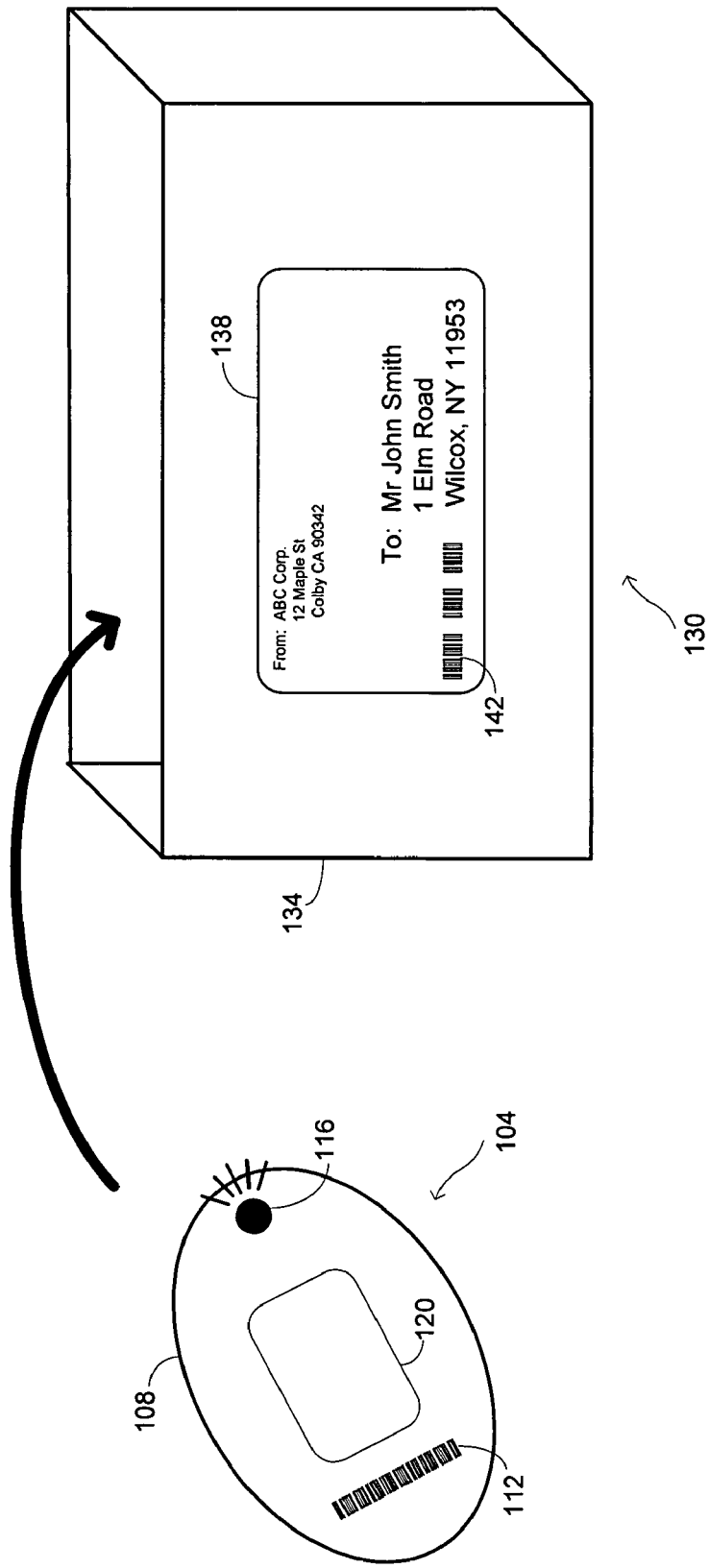
FIG. 1 is a schematic illustration of an rf device and a package for an rf device used in embodiments of the invention.

The general function embraced by embodiments of the invention is illustrated in FIG. 1, which shows an exemplary rf device in the form of a key fob 104 that includes an rf chip to which information may be written as described below. The fob 104 itself may include a housing 108 having an activation button 120 and enclosing an rf transponder 116 that is in electrical communication with the rf chip. The fob 104 may be identified with an rf-device optical code 112, shown in the example as a bar code printed on the housing 108. More generally, the optical code may comprise any optically readable indicia used in uniquely identifying the rf device. When encoded, such a fob 104 or other rf device may be used in accordance with functions enabled by the personalization information that is encoded. For instance, in cases where the personalization information comprises financial-account information such as may correspond to personalization information used on magnetic-stripe devices, the fob 104 may be used to engage in financial transactions. The fob 104 is provided near an rf reader and activated with the activation button 120. A code read from the fob 104 is then used to identify a financial account to be used in the transaction.

The packaging in which the rf device is transmitted to a recipient is denoted generally by reference number 130 in FIG. 1. The packaging 130 includes a structure 134 within which the rf device may be held, with a number of examples of different types of structures and methods for placing the rf devices within the structures described in U.S. patent application Ser. No. 10/718,481, which has been incorporated by reference. For instance, the packaging structure 134 may be a box, an envelope, or any other structure capable of containing one of the rf devices. The recipient is identified with a label 138, which may be affixed to the structure 134 as a separately prepared component or which may be printed directly onto the structure 134 in different embodiments. An optically readable code 142 that uniquely identifies the packaging 130 is provided on the label 138, and is shown for an exemplary embodiment in FIG. 1 in the form of a bar code. Other optically readable indicia may be provided in alternative embodiments.

Figure 2:
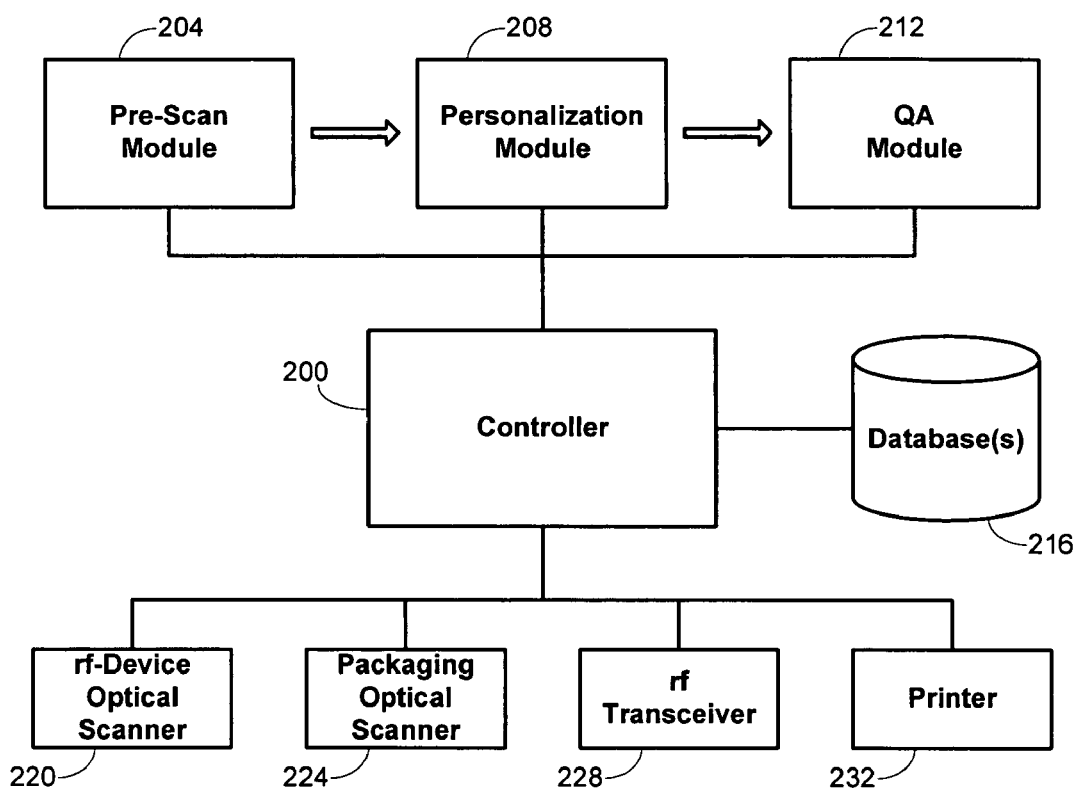
FIG. 2 is a schematic illustration of a system for packaging personalized radio-frequency devices in an embodiment of the invention.

In a typical automated application, the number of rf devices and packages to be addressed to recipients may be large. A general overview of a system that includes a number of different devices used in coordinating the packaging as described below is provided schematically in FIG. 2. The system includes a controller 200 that implements methods of the invention and acts to control and coordinate the activities of other components comprised by the system. The controller 200 is provided in communication with one or more databases 216, within which information is stored or information is extracted as described below in coordinating packaging of the rf devices. Other components of the system that may be provided in communication with and controlled by the controller 200 include an rf-device optical scanner 220 and a packaging optical scanner 224. Each of these devices is capable of reading and decoding the optical indicia provided respectively on the rf devices and packaging to identify them. For instance, in embodiments where the optical indicia comprise bar codes, each of the rf-device optical scanner 220 and packaging optical scanner 224 may comprise a standard bar-code reader. In some embodiments, such as when the optical indicia used on the rf devices and on the packaging are of the same type, the rf-device optical scanner 220 and packaging optical scanner 224 may be integrated as a single device. An rf transceiver 228 provided in communication with the controller 200 permits the transponder within each of the rf devices to be activated, enabling information to be read from or written to the rf chip within each rf device. A printer 232 may additionally be provided in communication with the controller 200 to enable the printing of labels for affixation to package structures; in some alternative embodiments, the printer 232 may be capable of printing directly on the package structures, allowing the affixation of labels to be avoided.

The controller 200 may also be provided in communication with one or more logical modules that include instructions for implementing methods of the invention. A pre-scan module 204 includes instructions that permit the system to be used in generating preliminary information that is stored within the database(s) 216 to facilitate later functions. A personalization module 208 includes instructions to enable personalization information to be encoded on an rf device and for that rf device to be reliably packaged within a package labeled for delivery to the correct recipient. A quality-assurance module 212 includes instructions that permit checks to be made of individual packaged rf devices to ensure that the recipient identified on the package corresponds to the correct personalization information encoded on the rf device within that package. It is generally expected that such quality-assurance processes will be performed on randomly selected samples, with statistical techniques being used to evaluate the reliability of the packaging. In some embodiments, however, the quality-assurance module may be used routinely with every packaged rf device as an additional aspect of the process, thereby decreasing even further the risk of misidentification. In some embodiments, particularly after the reliability of the technique has been well established within a particular operational environment, the quality-assurance processes may be omitted.

Figure 3A:
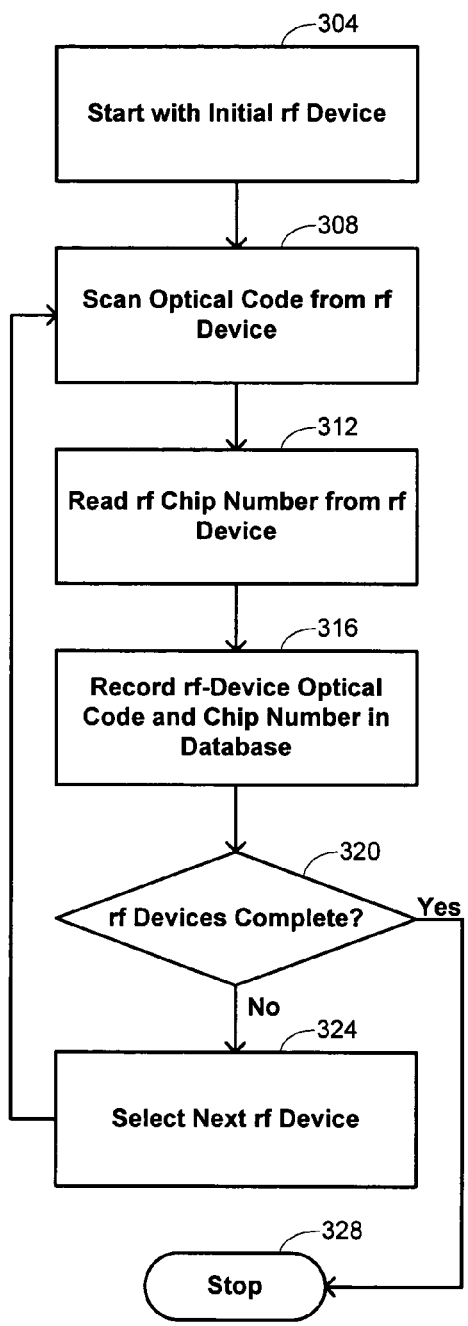
FIG. 3A is a flow diagram illustrating a prescanning process for a plurality of rf devices used in certain embodiments of the invention.
Figure 3B:
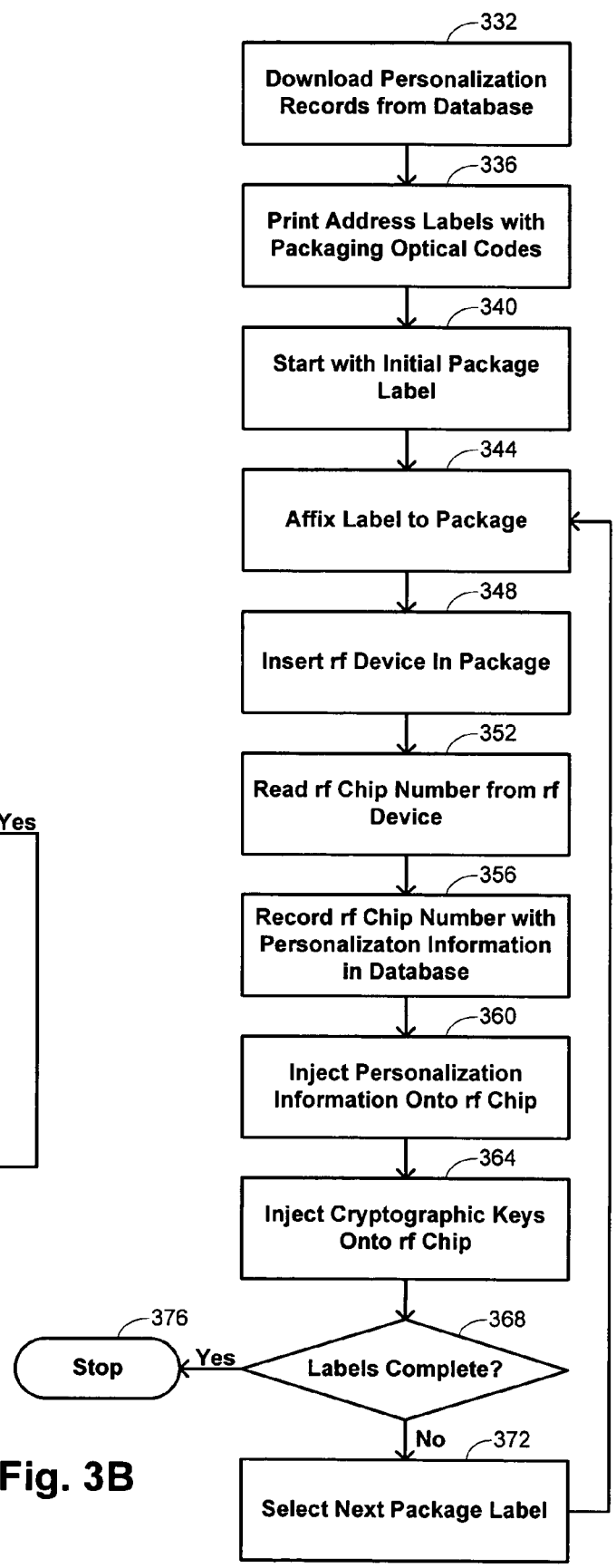
FIG. 3B is a flow diagram illustrating a method for packaging personalized radio-frequency devices in an embodiment of the invention.
Figure 3C:
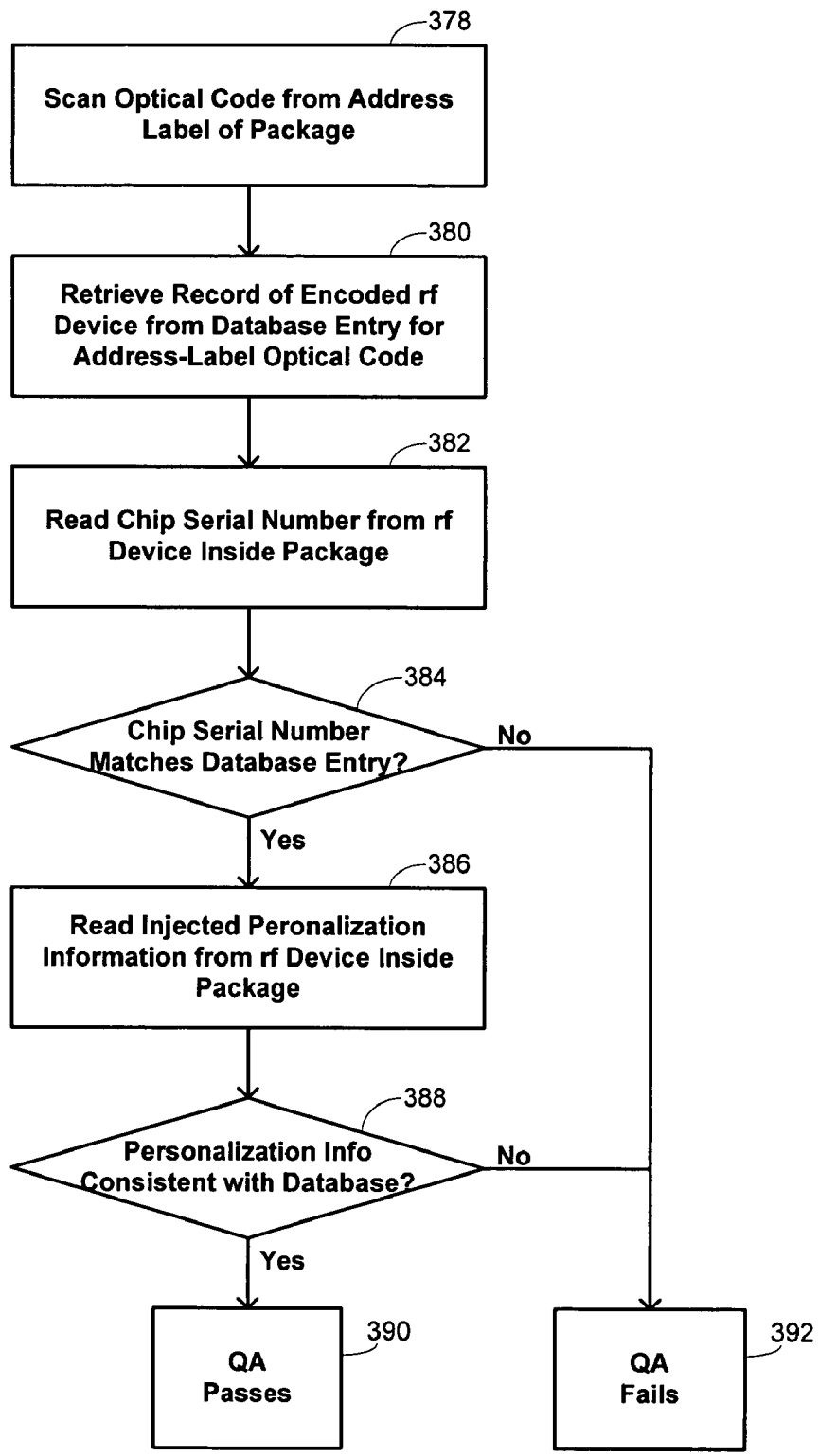
FIG. 3C is a flow diagram illustrating a quality-assurance process used in validating packaged rf devices in an embodiment of the invention.

Specific actions taken by components of system as directed by the controller 200 in accordance with instructions provided by the various logical modules is illustrated for some embodiments with the flow diagrams of FIGS. 3A-3C. The flow diagram of FIG. 3A corresponds to the prescanning process in which information is generated and stored within one or more databases for use in the personalization and quality-assurance processes, described respectively in connection with the flow diagrams of FIGS. 3B and 3C.

At block 304 of FIG. 3A, the prescanning procedure begins with an initial rf device, the process generally being performed as a batch procedure for a plurality of rf devices. At block 308, the optical code provided on the rf device is scanned with the rf-device optical scanner. At block 312, an identifier of the rf chip within the rf device is extracted by having the rf transceiver 228 activate the chip and return its identifier. Typically, the identifier is provided as a numerical value, but may more generally be provided as any alphanumeric string or other identification sequence that uniquely identifies the chip. A correspondence between the rf-device optical code and the chip identifier are recorded in a database 216 at block 316. This information thus always allows specification of either the chip identifier or the optical code to be used to identify the other for any of the prescanned optical devices. If prescanning has been completed for all of the optical devices within a batch, as checked at block 320, the procedure stops at block 328. If not, the procedure continues to the next rf device at block 324, and is repeated until prescanning has been completed for all the rf devices.

When a batch of rf devices are to be personalized, personalization information is initially downloaded from database 216 records at block 332. Such personalization information may generally be any information that is uniquely identified for each of a plurality of recipients of the rf devices within the batch, but in a particular embodiment comprises magnetic-stripe information used in providing financial-account information for the recipients. At block 336, labels are printed that identify the recipients, and may include address information that allows the packaged rf devices to be mailed or otherwise delivered to the recipients. The labels also include packaging optical codes that uniquely identify each of the packages within which an rf device is to be packaged.

The completion of such preliminary activities permits the actual personalization to begin at block 340 with one of the package labels. That label is affixed to one of the packages at block 344 and one of the rf devices is inserted within the package at block 348. In some embodiments, the method advantageously permits any of the rf devices to be inserted within the package at block 348 without at this point being concerned that it is the correct rf device to be delivered to the individual. Furthermore, in some instances, the rf devices may previously have been assembled within packages so that inserting the devices within the packages may be avoided in some embodiments. The identifier for the rf chip within the rf device is read with the rf transceiver 228 at block 352, a procedure that may be performed in some embodiments through the packaging structure after the rf device has been inserted. A correspondence between the rf device and the personalization information to be encoded on it is recorded in the database(s) 216 at block 356. When combined with the prescanning information, the database(s) thus include a record of the personalization information, a record of the identifier of the chip within the rf device, a record of the optical code on the rf device, and a record of the optical code on the packaging that contains that rf device. The personalization information is injected with the rf transceiver 228 at block 360. In some instances, the personalization information may be encrypted to provide security for the information, in which case relevant cryptographic keys may additionally be injected onto the chip with the rf transceiver 228 at block 364. For example, the cryptographic keys may comprise data-encryption-standard ("DES") keys.

This personalization process may be performed for each of the labels in a batch using the prescanned rf devices, thereby allowing the database(s) to contain comprehensive information correlating the rf devices with the chips they contain and the packages within which they are deposited. A check is made at block 368 whether all of the labels within a given batch have been processed in this way, with the procedure stopping at block 376 if they have. If not, the next package label is selected at block 372 and the process repeated with the package label.

Not only does the manner in which the personalization is performed decrease the risk of misidentification of an intended recipient for a particular rf device, it provides comprehensive database information that may be used in quality-assurance processes, such as illustrated with the flow diagram of FIG. 3C. For a given packaged rf device, the optical code on the label for the package may be scanned at block 378. By virtue of the correspondence of information in the database(s), this code identifies the optical code of the rf device that should be contained within the package, the identifier for the rf chip within that rf device, and the personalization information that should be included on the chip. Since the rf chip may be read through the packaging, a comparison of these properties may be performed with the actual properties of the chip within the packaging. Thus the chip identifier for the rf device that is within the packaging is read at block 382 and compared with the expected identifier recorded in the database(s) at block 384. If they fail to match, the quality-assurance test is designated at block 392 as having failed. If they correspond, a further comparison may be made by reading the personalization information from the rf device at block 386 and comparing it with the expected personalization information defined by the database(s) at block 388. Again, if they fail to match, the quality-assurance is designated as having failed at block 392. If both the chip identifier and personalization information are found to correspond, however, the quality-assurance test is designated as having passed at block 390. In further embodiments, other information may additionally compared as part of the quality-assurance process, such as by comparing the encryption keys on the device with those identified in the database.

The flow diagrams of FIGS. 3A-3C provide a particular sequence that may be followed in particular embodiments of the invention. It should be understood, however, that this particular sequence is merely exemplary and that other sequences may be used in alternative embodiments. Furthermore, the specific identification of steps that are performed is not intended to be limiting; in some embodiments some of the steps for the exemplary embodiments may be omitted while in other embodiments additional steps may be performed.

Figure 4:
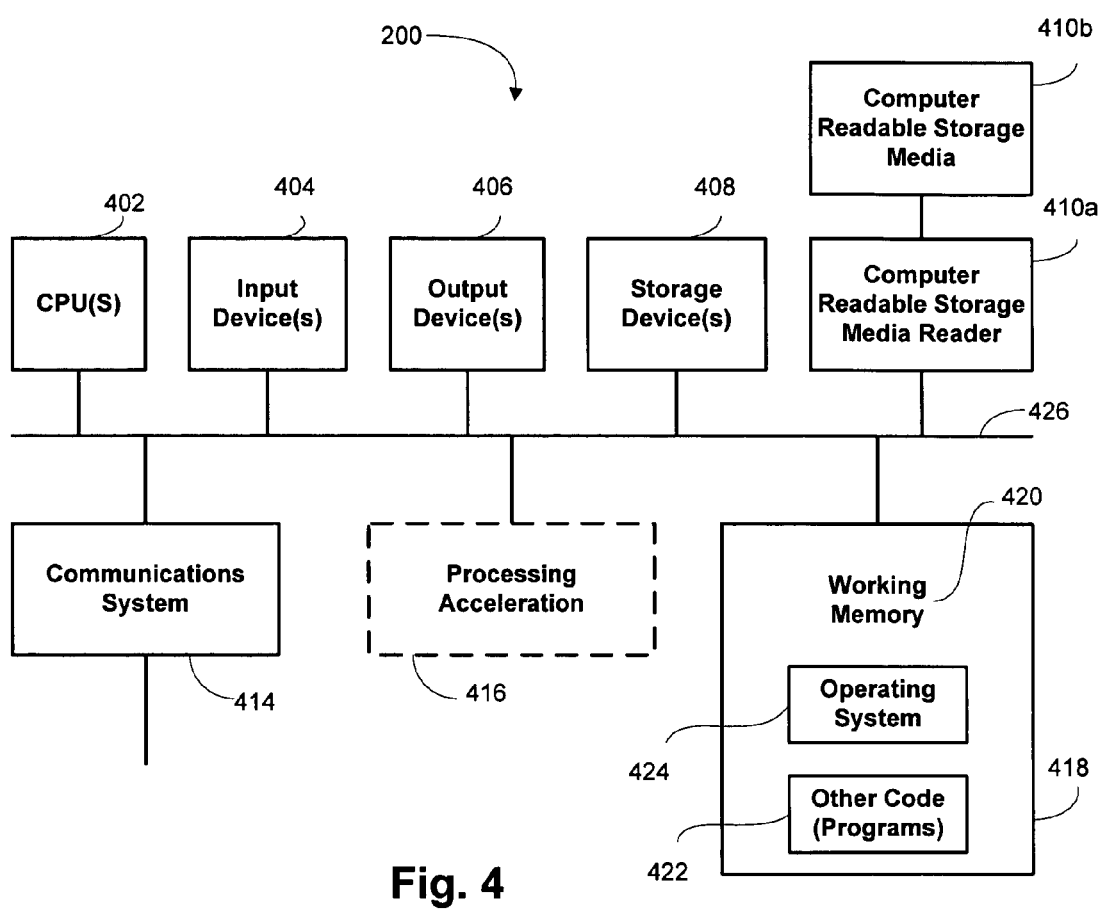
FIG. 4 is a schematic illustration of a controller that may be used with automated systems in embodiments of the invention.

FIG. 4 provides a schematic illustration of a structure that may be used to implement the controller 200 in the preceding embodiments. FIG. 4 broadly illustrates how individual system elements may be implemented in a separated or more integrated manner. The controller 200 is shown comprised of hardware elements that are electrically coupled via bus 426, including a processor 402, an input device 404, an output device 406, a storage device 408, a computer-readable storage media reader 410a, a communications system 414, a processing acceleration unit 416 such as a DSP or special-purpose processor, and a memory 418. The database information 216 may conveniently be stored on the storage device(s) 408. The computer-readable storage media reader 410a is further connected to a computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with other devices.

The controller 200 also comprises software elements, which may conveniently correspond to modules 204, 208, and 212 when the modules are integrated with the controller. The software elements are shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of personalizing a radio-frequency device that comprises a radio-frequency chip internal to the radio-frequency device, the method comprising:
   downloading a record for the radio-frequency device from a records database;
   inserting the radio-frequency device into a package;
   electromagnetically reading an identifier from the radio-frequency chip with a radio-frequency transceiver while the radio-frequency device is within the package;
   determining personalization information from the record, wherein the personalization information comprises financial-account information defining a financial account used to support financial transactions and corresponding to information recorded on a magnetic stripe of a magnetic-stripe device;
   electromagnetically writing the personalization information onto the radio-frequency chip while the radio-frequency device is within the package; and
   recording an association between the personalization information and the identifier on a storage device.

2. The method recited in claim 1 wherein the package is labeled for delivery to a recipient prior to inserting the radio-frequency device into the package.

3. The method recited in claim 2 further comprising, prior to writing the personalization information onto the radio-frequency chip:

reading an optical code from the labeled package; and
   identifying the personalization information to be written onto the radio-frequency chip from the optical code.

4. The method recited in claim 3 wherein the optical code comprises a bar code.

5. The method recited in claim 3 further comprising, after writing the personalization information onto the radio frequency chip, as part of a quality-assurance process:
   reading the optical code from the labeled package;
   identifying the personalization information to have been written onto the radio-frequency chip from the optical code;
   electromagnetically reading the identifier from the radio-frequency chip while the radio-frequency device is within the package;
   retrieving a purported identifier from a record of an association between the personalization information and the purported identifier; and
   comparing the identifier with the purported identifier.

6. The method recited in claim 5 further comprising:
   electromagnetically reading the personalization information from the radio-frequency chip while the radio-frequency device is within the package; and
   comparing the retrieved personalization information with the identified personalization information to have been written onto the radio-frequency chip.

7. The method recited in claim 1 wherein the identifier comprises an alphanumeric string.

8. The method recited in claim 1 further comprising:
   encrypting the personalization information prior to electromagnetically writing the personalization information onto the radio-frequency chip; and
   electromagnetically writing an encryption key onto the radio-frequency chip.

9. The method recited in claim 1 wherein:
   the radio-frequency device comprises an optical code; and
   recording the association between the personalization information and the identifier comprises recording an association among the personalization information, the identifier, and the optical code.

10. The method recited in claim 9 further comprising, prior to inserting the radio-frequency device into the package:
    reading the optical code from the radio-frequency device;
    electromagnetically reading the identifier from the radio-frequency chip; and
    recording an association between the optical code and the identifier on the storage device.

11. The method recited in claim 1 wherein the personalization information identifies a financial account.

12. A method of preparing a radio-frequency device for delivery to a recipient, the radio-frequency device comprising a radio-frequency chip internal to the radio-frequency device and a first optical code, the method comprising:
    initializing a record for the radio-frequency device, the initializing comprising:
      reading the first optical code from the radio-frequency device;
      electromagnetically reading an identifier from the radio-frequency chip; and
      recording an association between the first optical code and the identifier as part of the record; and
    thereafter, personalizing the radio-frequency device, the personalizing comprising:
      labeling a package with a second optical code and an identification of the recipient;
      inserting the radio-frequency device into the package;

electromagnetically reading the identifier from the radio-frequency chip while the radio-frequency device is within the package;
determining the first optical code from the recorded association between the first optical code and the identifier;
identifying personalization information from the second optical code;
electromagnetically writing the personalization information onto the radio-frequency chip while the radio-frequency device is within the package; and
recording an association among the personalization information, the identifier, the first optical code, and the second optical code.

13. The method recited in claim 12 further comprising thereafter verifying the personalization information written onto the radio-frequency chip as part of a quality-assurance process, the verifying comprising:
reading the second optical code from the labeled package;
identifying the personalization information to have been written onto the radio-frequency chip from the second optical code;
electromagnetically reading the identifier from the radio-frequency chip while the radio-frequency device is within the package;
retrieving a purported identifier from a record of an association among the personalization information, the purported identifier, the first optical code, and the second optical code; and
comparing the identifier with the purported identifier.

14. The method recited in claim 13 wherein the verifying further comprises:
electromagnetically reading the personalization information from the radio-frequency chip while the radio-frequency device is within the package; and
comparing the retrieved personalization information with the identified personalization information to have been written onto the radio-frequency chip.

15. A method for personalizing a plurality of radio-frequency devices in an automated process, each such radio-frequency device comprising a radio-frequency chip internal to the radio-frequency device, the method comprising:
labeling a plurality of packages, each such package comprising an optical code and delivery information for a recipient of one of the plurality of radio-frequency devices;
for each of the plurality of radio-frequency devices,
downloading a record for the each of the plurality of radio-frequency devices from a records database;
inserting the each of the plurality of radio-frequency devices into one of the plurality of packages;
reading the optical code from the one of the plurality of packages;
identifying the record for the each of the plurality of radio-frequency devices from the read optical code;
identifying personalization information to be written to the radio-frequency chip of the each of the plurality of radio-frequency devices from the record, wherein the personalization information comprises financial-account information defining a financial account used to support financial transactions and corresponding to information recorded on a magnetic stripe of a magnetic-stripe device;
electromagnetically reading an identifier from the radio-frequency chip of the each of the plurality of radio-frequency devices while the each of the plurality of radio-frequency devices is within the package;
encrypting the identified personalization information;
electromagnetically writing the encrypted personalization information onto the radio-frequency chip of the each of the plurality of radio-frequency devices while the each of the radio-frequency devices is within the package;
electromagnetically writing an encryption key onto the radio-frequency chip of the each of the plurality of radio-frequency devices; and
recording an association between the identified personalization information and the identifier on a storage device; and
transmitting the plurality of packages to recipients according to the delivery information.

16. The method recited in claim 15 wherein labeling the plurality of packages comprises:
printing a label for each of the plurality of packages, the label including the optical code and the delivery information; and
affixing the label to the each of the plurality of packages.

17. The method recited in claim 15 wherein the delivery information for the recipient comprises an address for the recipient.

18. The method recited in claim 15 further comprising verifying the personalization information written onto the radio-frequency chip for each of a subset of the plurality of radio-frequency devices, the verifying comprising:
reading the optical code from one of the plurality of packages, the each of the subset of the plurality of radio-frequency devices being within the one of the plurality of packages;
identifying the personalization information to have been written onto the radio-frequency chip comprised by the each of the subset of the plurality of radio-frequency devices from the read optical code;
electromagnetically reading the identifier from the radio-frequency chip comprised by the each of the subset of the plurality of radio-frequency devices while the each of the subset of the plurality of radio-frequency devices is within the one of the plurality of packages;
retrieving a purported identifier from a record of an association among the personalization information to have been written onto the radio-frequency chip comprised by the each of the subset of the plurality of radio-frequency devices, the purported identifier, and the optical code read from the one of the plurality of packages; and
comparing the identifier with the purported identifier.

19. The method recited in claim 15 wherein each such radio-frequency device further comprises a optical code associated with the identifier for the radio-frequency chip comprised by the each such radio-frequency device and optically readable from the each such radio-frequency device.

20. The method recited in claim 19 wherein the optical code associated with the identifier for the radio-frequency chip comprises a bar code.

21. The method recited in claim 15 wherein the optical code comprised by each such package comprises a bar code.

* * * * *